(12) United States Patent
Nakata et al.

(10) Patent No.: US 11,809,566 B2
(45) Date of Patent: Nov. 7, 2023

(54) METHODS FOR FAST, SECURE BOOT FROM NONVOLATILE MEMORY DEVICE AND CORRESPONDING SYSTEMS AND DEVICES FOR THE SAME

(71) Applicant: Infineon Technologies LLC, San Jose, CA (US)

(72) Inventors: Daisuke Nakata, Yokohama (JP); Shinsuke Okada, Kawasaki (JP)

(73) Assignee: INFINEON TECHNOLOGIES LLC, San Jose, CA (US)

( * ) Notice: Subject to any disclaimer, the term of this patent is extended or adjusted under 35 U.S.C. 154(b) by 270 days.

(21) Appl. No.: 17/122,927

(22) Filed: Dec. 15, 2020

(65) Prior Publication Data

US 2022/0108016 A1 Apr. 7, 2022

Related U.S. Application Data

(60) Provisional application No. 63/086,750, filed on Oct. 2, 2020.

(51) Int. Cl.
*G06F 21/51* (2013.01)
*G06F 21/57* (2013.01)
*G06F 21/64* (2013.01)
*H04L 9/32* (2006.01)

(52) U.S. Cl.
CPC .......... *G06F 21/572* (2013.01); *G06F 21/51* (2013.01); *G06F 21/575* (2013.01); *G06F 21/64* (2013.01); *H04L 9/3242* (2013.01); *H04L 9/3247* (2013.01); *H04L 9/3268* (2013.01); *G06F 2221/033* (2013.01); *H04L 2209/84* (2013.01)

(58) Field of Classification Search
CPC ....... H04L 9/32; H04L 9/3242; H04L 9/3247; G06F 2221/033; G06F 21/575; G06F 21/64
See application file for complete search history.

(56) References Cited

U.S. PATENT DOCUMENTS

| 11,106,796 B2 * | 8/2021 | Limonciello ........... G06F 21/57 |
| 11,347,861 B2 * | 5/2022 | Areno .................... H04L 9/0866 |
| 2008/0082819 A1 * | 4/2008 | Brizek ................... H04L 9/3242 713/168 |

(Continued)

OTHER PUBLICATIONS

International Search Report and Written Opinion for International Application No. PCT/US21/53138 14 Pages dated Dec. 28, 2021.

(Continued)

*Primary Examiner* — Shaqueal D Wade-Wright

(57) ABSTRACT

A method can include storing host code executable by a host device in a nonvolatile memory (NVM) device and NVM code executable by the NVM device. The NVM device can validate the integrity of the NVM code in response to predetermined conditions and generate a code integrity value for validating the NVM code. The code integrity value having a size independent of a size of the host code. An authentication code can be sent to the host device that is generated with at least the code integrity value. In response to read requests from the host device, returning at least portions of the host code for execution by the host device. Corresponding devices and systems are also disclosed.

23 Claims, 14 Drawing Sheets

(56) References Cited

U.S. PATENT DOCUMENTS

| | | | |
|---|---|---|---|
| 2009/0110190 A1* | 4/2009 | Dolgunov | G06F 9/4403 |
| | | | 713/189 |
| 2011/0051520 A1 | 3/2011 | Kim | |
| 2012/0102567 A1 | 4/2012 | Fresko et al. | |
| 2015/0019793 A1 | 1/2015 | Dover | |
| 2017/0063853 A1 | 3/2017 | Lim | |
| 2017/0250192 A1 | 8/2017 | Lu et al. | |
| 2018/0157841 A1* | 6/2018 | Shin | G06F 21/44 |
| 2019/0147165 A1* | 5/2019 | Chen | H04L 9/0643 |
| | | | 726/22 |
| 2020/0082089 A1* | 3/2020 | Strong | G06F 9/30003 |
| 2022/0021544 A1* | 1/2022 | Dover | H04L 9/3247 |

OTHER PUBLICATIONS

Dubeyko "Processor in Non-Volatile Memory (PiNVSM): Toward to Data-centric Computing in Decentralized Environment", ArXiv preprint, Mar. 8, 2019, 15 pages.

* cited by examiner (BACKGROUND)

US 11,809,566 B2

METHODS FOR FAST, SECURE BOOT FROM NONVOLATILE MEMORY DEVICE AND CORRESPONDING SYSTEMS AND DEVICES FOR THE SAME

RELATED APPLICATIONS

This application claims the benefit of U.S. provisional patent application having Ser. No. 63/086,750, filed on Oct. 2, 2020, the contents of which are incorporated by reference herein.

TECHNICAL FIELD

The present disclosure relates generally to systems having a host device that executes code stored on a nonvolatile memory device, and more particularly systems where a host device authenticates code stored on a nonvolatile memory device

BACKGROUND

Systems that include processors can have boot operations in which code for execution by a processor, e.g., software (SW) or firmware (FW), can be loaded from a memory device. Boot operations can occur in response to power-on and/or reset events, for example. Code for boot operations is typically stored in a nonvolatile memory (NVM) device.

The ability to have a "secure" boot can be critical for many systems. A secure boot relies on establishing the integrity of the code before it is executed by a processor. Conventionally, the integrity of code can be established by a host device measuring the code contents upon system boot up. Measuring code contents depends on the size of the code (e.g., SW image) as stored by the nonvolatile device. A total boot up time (time) can be given by:

$$time = tbl + tapp \quad tapp = BWmeasure * Sizeapp$$

where tbl is a boot loader loading time, tapp is an application measurement (integrity check) time, BWmeasure is transfer rate (e.g., time per byte), and Sizeapp is the size of the SW image (e.g., bytes). Thus, a boot up time can depend on the size of the SW image.

FIG. 17 is a block diagram showing a conventional boot up sequence for a system 1701. A system 1701 can include a NVM device 1703 and a host device 1705. In a boot-up sequence, power-on reset circuits 1707-0 in NVM device 1703 can detect a power-on or reset condition, and power-up the NVM device 1703 to make it operational.

Within host device 1705, host POR circuits 1707-1 can detect a power-on or reset condition. In response, host device 1705 can perform a read-only memory (ROM) boot operation 1709, which can load boot data from a ROM. Host device 1705 can then execute a boot loading operation 1715, which includes reading boot loading data 1711 from NVM device 1703. Integrity of boot loading data 1711 can be subject to a measurement operation 1717-0. This can include generating a hash value from the boot loading data 1711 with a hash function 1717 and/or a decrypting boot loader data with a decryption function 1719. A ROM boot operation 1709 and boot loading operation 1715 can occur during a boot load time tbl 1721.

A host device 1705 can then perform an application software (AppSW) integrity operation 1723. This can include a measurement operation 1717-1 of AppSW 1725 stored on the NVM device 1703. The AppSW integrity operation 1723 can occupy a time tapp 1727, which can vary according to the size of AppsSW, as noted above.

A drawback to a conventional boot sequence like that of FIG. 17, is that boot times will increase as SW size increases. As but one example, this can be problematic in some systems, such as those operating on a controller area network (CAN), where a boot time can exceed the bus response time limits for larger SW sizes.

DETAILED DESCRIPTION

Figure 1A:
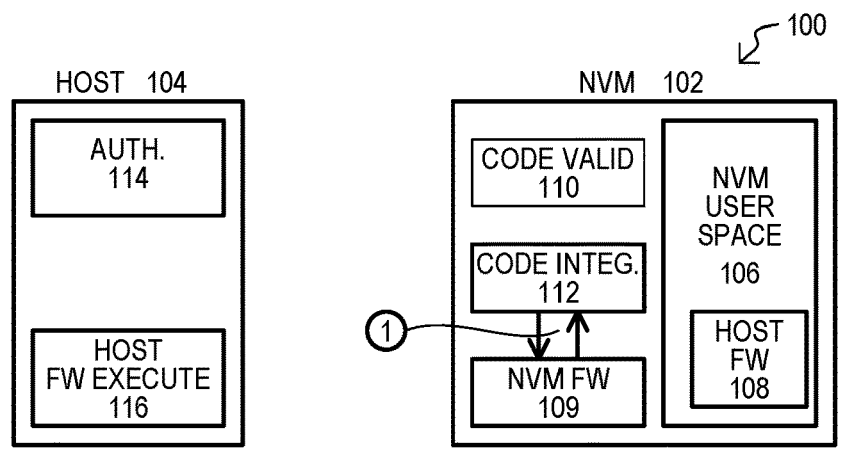
FIGS. 1A to 1C are a sequence of block diagrams showing an authentication method for a system having a host device and a nonvolatile memory (NVM) device according to an embodiment.

According to embodiments, a nonvolatile memory (NVM) device can store host code for execution by a host device and NVM code for execution by the NVM device itself. In response to predetermined conditions (e.g., power-on or reset), the NVM device can check the integrity of the NVM code. The NVM device can store a code integrity value, which is transmitted to the host device in an authentication code. The host device can authenticate the code stored by the NVM based on the authentication code, and not by measuring the stored host code.

In some embodiments, a code integrity value can be a hash value of a known good version of the NVM code.

In some embodiments, a NVM device can encrypt the authentication code with a private key and the host device can decrypt the authentication code with a public key.

In some embodiments, an NVM device can generate a hash value of the NVM code that is read by the host device. The host device can compare the hash value read from the NVM device to a known valid hash value to authenticate the NVM device, and thus the host code stored by the NVM device.

In the various embodiments below, like items are referred to by the same reference characters, but with the leading digit(s) corresponding to the figure number.

Figure 1B:
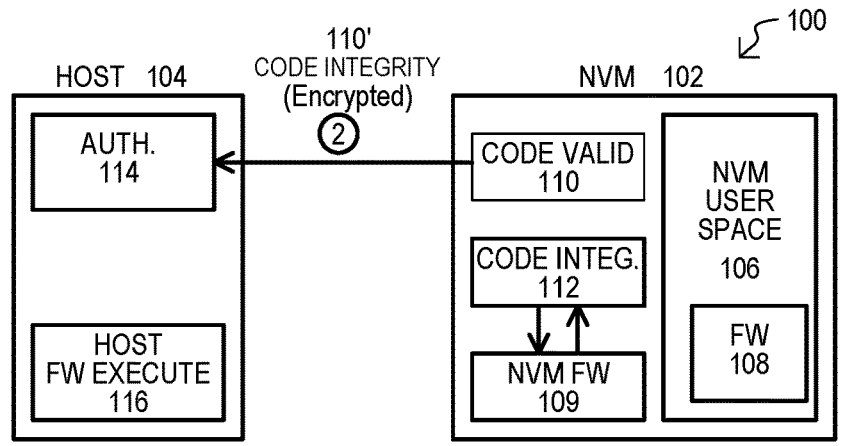
Figure 1C:
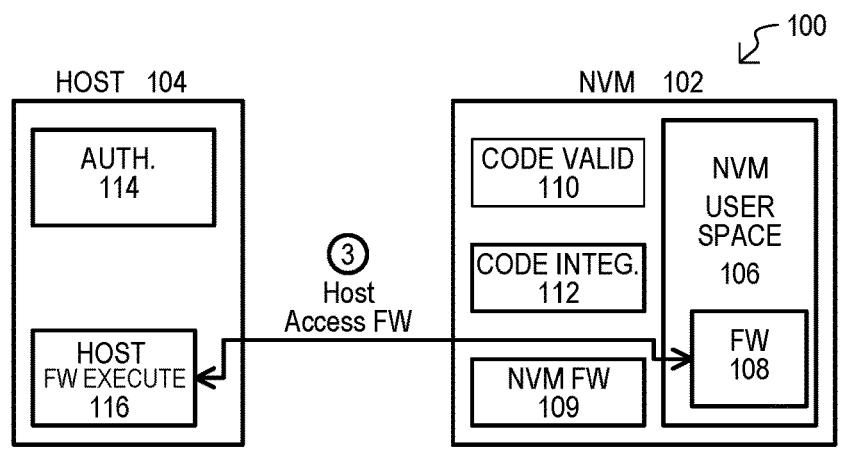

FIGS. 1A to 1C are block diagrams of a system 100 according to an embodiment. A system 100 can include a NVM device 102 and a host device 104. A NVM device 102 can include a NVM user space 106, host firmware (FW) 108, NVM firmware 109, a code integrity value 110, and a code integrity checker 112. NVM user space 106 can include one or more arrays of NVM cells for storing data, including host FW (e.g., code) 108 and NVM FW 109. NVM arrays can take any suitable form, including but not limited to a NOR configuration. Host FW 108 can be a firmware image that is executable by a host device 104. NVM FW 109 can be a firmware image that is executable by the NVM device 102. In some embodiments, NVM FW 109 is stored in a secure memory region of NVM device 102 and is not accessible outside of the NVM device, or only accessible with a secure access procedure.

A code integrity value 110 can be a value that represents the integrity of NVM device 102 and thus can authenticate the integrity of host FW 108. A code integrity value 110 can be used by a host device 104 to authenticate NVM device 102, and thus not require the host device 102 to evaluate the host FW 108 with a measurement operation, as in conventional approaches. A code integrity value 110 can have a bit size that does not vary according to the size of the host FW 108. In some embodiments, a code integrity value 110 can be hash value generated by a hashing function executed on a known valid version of NVM FW 109. In some embodiments, a code integrity value 110 can be stored in a secure location of NVM device 102 (not shown). A secure location can be a storage region that is only accessible through a security procedure (such as authentication, as but one example). In some embodiments, a code integrity value 110 can be stored in an unencrypted state (e.g., in secure region). However, in other embodiment such a value can be stored in an encrypted state on NVM device 102.

A code integrity checker 112 can make a measurement of NVM FW 109 for use in an integrity evaluation of the NVM device 102 (and thus host FW 108 stored by NVM device 102). Such an operation can take any suitable form, including measuring all, or portions of the NVM FW 109. In some embodiments, a code integrity checker 112 can generate a single hash value from the NVM FW 109. In some embodiments, such a generated hash value can be compared to a known valid hash value (e.g., code integrity value 110). A code integrity checker 112 can take any suitable form, including but not limited to: a NVM processor executing stored instructions and/or logic circuits designed for the function. In some embodiments, if a code integrity checker 112 determines the stored NVM FW 109 is not valid, a NVM 102 can prevent any access to the host FW 108 (which cannot be guaranteed to be valid).

A host device 104 can be in communication with NVM 102 via any suitable means, including a wired or wireless connection. In some embodiments, a host device 104 can communicate with NVM device 102 over a serial bus. A host device 104 can include an authentication function 114 and a host FW execution function 116. An authentication function 114 can authenticate FW 108 using a code integrity value 110 provided from NVM 102. Host FW execution function 116 can execute the host FW 108 stored on NVM device 102 to provide various system applications. In some embodiments, host FW execution function 116 can be an execute-in-place (XIP) function, that executes code directly from NVM 102. However, in other embodiments, a host FW execution function 116 can load host FW 108 into a host memory (e.g., DRAM not shown) on host device 104. The host device 104 can then execute the host FW from the host memory.

Operations of system 100 will now be described.

Referring to FIG. 1A, in response to certain conditions, NVM device 102 can check the integrity of NVM FW 109 ①. In some embodiments, such conditions can include power-on or reset. However, an integrity check operation can be triggered in response to any other suitable condition, including a predetermined command issued by a host device 104. A FW integrity check operation ① can take the form of any of those described herein, or equivalents.

Referring to FIG. 1B, NVM device 102 can send an encrypted code integrity value 110' to host device 104. A host device 104 can authenticate NVM FW 109 based on the encrypted code integrity value 110'. In some embodiments, a host device 104 can access the NVM device 102 to read additional data in an authentication operation (e.g., to retrieve a hash value of currently stored FW 108). Encrypted code integrity value 110' can have a size independent of a size of the host FW 108, and thus can be accessed in a predetermined amount of time (e.g., one read operation). As a result, a time for boot operations can be faster and/or more deterministic than conventional approaches. Authenticating the NVM FW 109 can authenticate a state of the NVM device 102, and thus a state of the host FW 108 stored by the NVM device 102.

Referring to FIG. 1C, once a host device 104 has authenticated the host FW 108, the host device 104 can access host FW 108 for execution by FW execution function 116. In some embodiments, host FW 108 can be executed in place. In other embodiments, FW 108 can be loaded into a host memory (not shown).

According to embodiments, instead of a host device proving the integrity of code (e.g., SW, FW) stored in NVM device by a measurement operation, a host device can prove the integrity of the cryptographic state of the NVM device. Proving that the hardware (HW) and NVM FW of the NVM device are in a valid cryptographic state can prove that no tampering has occurred with the NVM device. That is, content (e.g., code) programmed into the NVM device can verified to be correct in valid cryptographic state. Thus, if the NVM device has not been tampered with, the content stored in the NVM device (e.g., host code) cannot have been compromised.

Figure 17:
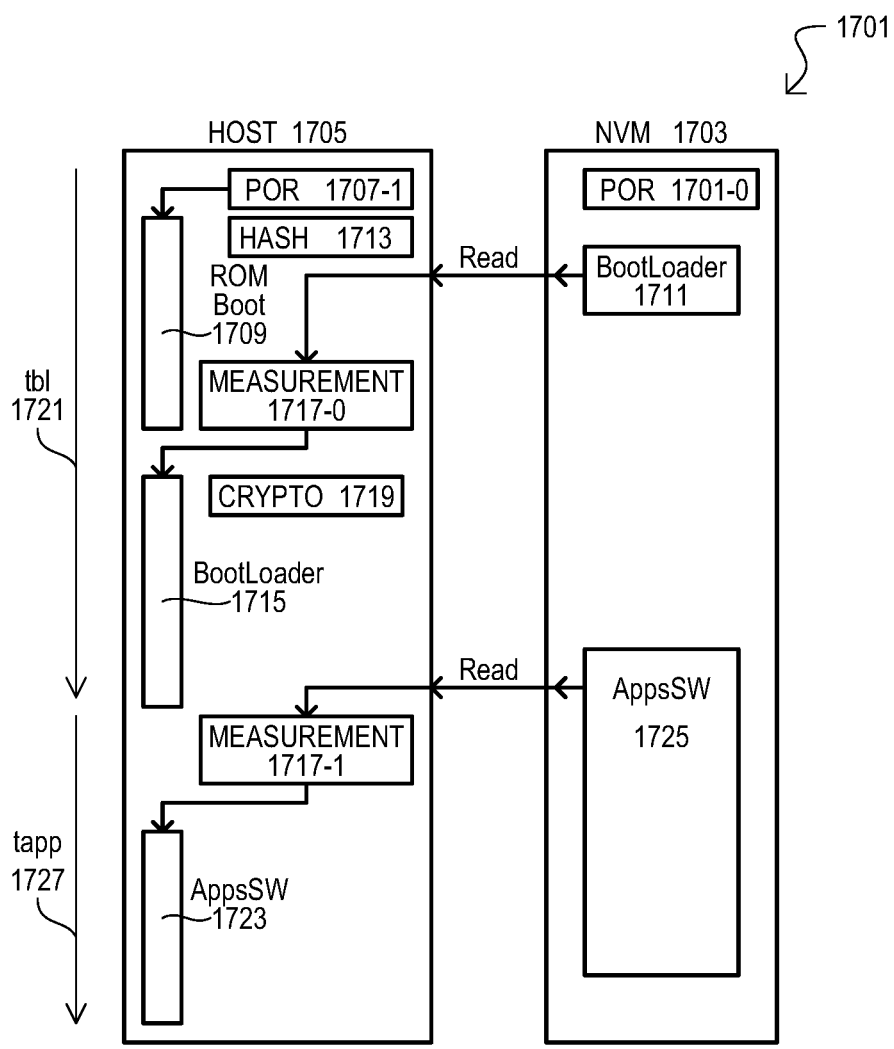
FIG. 17 is a block diagram of a conventional secure boot operation.

Proving a cryptographic state of an NVM device, as opposed to the cryptographic state of an image (e.g., SW) stored by the NVM device, can be a fixed time operation, and independent of the image size. This is in contrast to conventional approaches, like that shown in FIG. 17.

Figure 2:
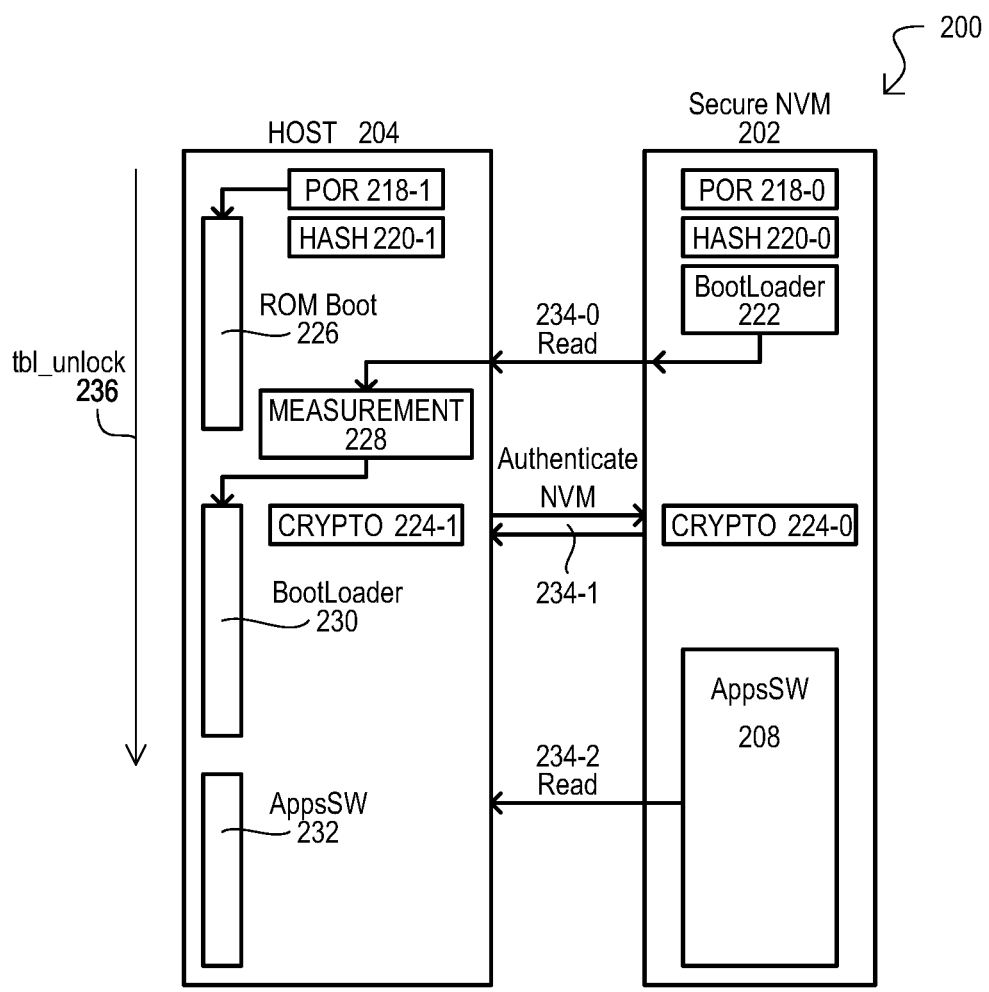
FIG. 2 is a block diagram showing a method of authenticating software stored in an NVM device according to an embodiment.

FIG. 2 is a block diagram of a system 200 showing a boot up sequence according to an embodiment. A system 200 can include a secure NVM device 202 and a host device 204. NVM device 202 can store application software (AppSW) 208 for execution by host device 204. NVM device 202 can include a power-on reset (POR) circuit 218-0, hashing function 220-0, and boot loader code 222, and cryptographic function 224-0. A host device 204 can include POR circuits 218-1, host hashing function 220-1, and measurement function 228.

In a boot-up sequence, in response to a power-on or reset condition, POR circuits 218-0 can power up the NVM device 202. In some embodiments, a hash function 220-0 can be used to generate a code integrity value from NVM code stored by NVM device 202.

Within host device 204, POR circuits 218-1 can start-up the host device 204, which can enter a read-only memory (ROM) boot operation 226. This can include processing circuits (not shown) accessing a read only memory (ROM) boot code to enable initial functionality.

Once a host device 204 has powered up and is functional, it can read boot loader code from NVM device 202 234-0. By operation of ROM boot code, host device 204 can execute a measurement operation 228 on boot loader code 222, and if boot loader code 222 is valid, load the boot loader code 222. In a boot loading function 222, by operation of installed boot loader code 222, host device 204 can authenticate the NVM device 202 (and thus its stored AppsSW 208). In some embodiments, a host device 204 can access authentication data with a read command, or the like. Authentication data 234-1 read from NVM device 202 by host device 204 can be of limited size, and independent of the size of firmware stored by NVM device 202. Authentication data 234-1 can include a code integrity value, as described herein or an equivalent.

Once the state of NVM device 202 is authenticated, host device 204 can perform an application execution operation 232, which can access and execute software (e.g., AppsSW 208) stored on the NVM device 202. In some embodiments, this can include reading software 234-2 from NVM device 202 for execution in place, or for storage in a host memory on host device 204 for execution.

A time required for a host device 204 to boot up and unlock (e.g., authenticate) NVM device 204, shown as tbl_unlock 236, can include a ROM boot operation 226 and a boot loader operation 230. It is understood that, in contrast to the conventional boot up sequence of FIG. 17, a time tbl_unlock 236 can be a set value that is independent of a size of firmware stored by NVM device 202, as there is no measurement of such firmware, only measurement of boot loader code 222).

Figure 3:
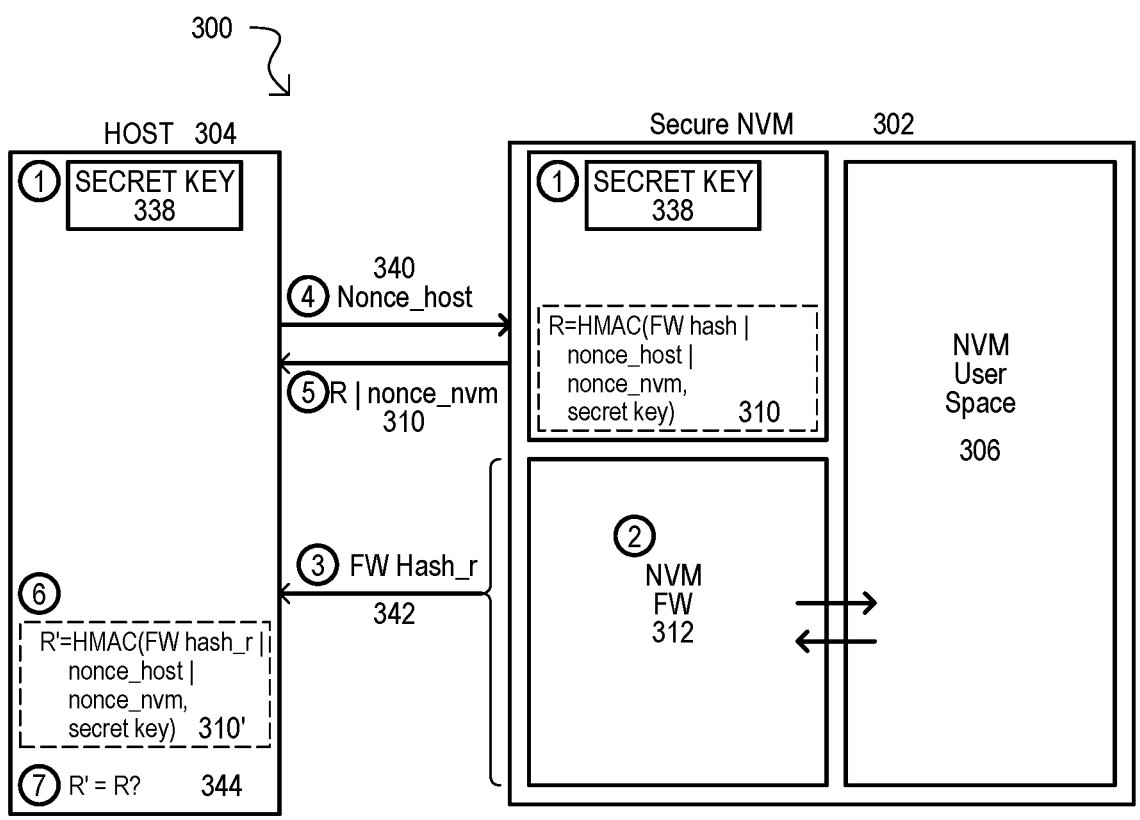
FIG. 3 is a block diagram of a system and corresponding method of authenticating an NVM device state with symmetric encryption according to an embodiment.

While an authentication operation between a NVM device and host device can take any suitable form, in some embodiments, authentication can be based on symmetric cryptography. FIG. 3 shows one such embodiment.

FIG. 3 shows a system 300 that includes an NVM device 302 and a host device 304. In system 300, it is assumed that NVM device 302 can check its own FW integrity upon boot. Further, the NVM device 302 and host device 304 share a secret key.

According to embodiments, upon boot (e.g., power-on or reset) a host device 304 can send a challenge to the NVM device 302. In response to the challenge, the NVM device 302 can generate a response. Host device 304 can validate the response. If the NVM device 302 response is valid, the NVM device 302 (and its stored FW) can be authenticated and the FW can be accessed for execution by the host device 304.

Referring still to FIG. 3, an NVM device 302 can be in communication with host device 304 over one or more connections. Such connections can include wired or wireless connections, and in particular embodiments can include a serial bus.

NVM device 302 can be a secure device having storage locations that cannot be accessed from outside of the NVM device 302 absent some authentication or other security procedure. NVM device 302 can include a user space 306, store a secret key 338, generate an authentication code 310, and can store NVM code which can be checked to generate a code check value 312. A user space 306 can include storage location accessible by other devices (e.g., host device 304), including host FW for execution by host device 304. A user space 306 can be formed by one or more NVM arrays. A secret key 338 can be stored in a secure location on NVM device 302. In some embodiments, such a secure location can be an NVM array, or portion of an NVM array, designed for secure access. Authentication code generator 310 can generate an authentication code according to any suitable manner, and in the embodiment shown, can generate a hashed-based message authentication code (HMAC). An authentication code (R) can be generated with an encrypted code integrity value (FW Hash). A code integrity value (FW Hash) can be used to validate NVM FW stored by the NVM device 302. In the embodiment shown, FW Hash can be a hash value generated from a known good NVM FW image. A code integrity value generator 312 can generate a code check value (FW Hash_r) for NVM FW currently stored (but not necessarily known to be valid) by NVM device 302.

A host device 304 can store the same secret key 338 as NVM device 302, generate a host nonce value (Nonce_host) 340, generate a check authentication value 310' in the same fashion as NVM device 302, and can compare authentication values 344.

Having described the components of the system 300, an authentication operation for the system 300 will now be described.

At ①, NVM device 302 and host device 304 can store a same secret key (for symmetric authentication).

At ②, NVM device 302 can generate a code check value (FW Hash_r) for NVM FW. A code check value (FW Hash_r) can represent a measurement of the NVM FW currently stored on NVM device 302. In the embodiment shown, FW Hash_r can be hash value of NVM FW generated with the same hash function used to generate a valid code integrity value (FW Hash) stored by NVM device 302.

At ③, host device 304 can read the code check value (FW Hash_r) 342 from NVM device 302. This is in contrast to conventional approaches in which a host device 304 can read all of host FW from NVM user space 306 for a measurement operation.

At ④, a host device 304 can send a host nonce value (nonce_host) to NVM device 302. A host nonce value can be a one-time value generated by any suitable manner, including but not limited to: retrieving a stored nonce value or using a nonce generator located on the host device 304 (e.g., random or pseudo-random number generator). Nonce_host can be sent to NVM device 302 in any suitable manner, including but not limited to: transmitting a predetermined command that includes the nonce value or writing to a predetermined location (e.g., register) of the NVM device 302.

At ⑤, a NVM device 302 can generate authentication code (R) 310 and send it to host device 304. In the embodiment shown, authentication code (R) 310 can be generated by encrypting the following with the secret key 338: a code integrity value FW Hash, the nonce_host value, and a nonce value generated by the NVM (nonce_nvm). The resulting encrypted value can be subject to a HMAC function to generate a hash value to generate R. The authentication value R can then be sent to host device 304 accompanied with the nonce_nvm value. Values R and nonce_nvm can be sent to host device 304 in any suitable manner, including but not limited to: as data in response to a read request from host device 304 (e.g., register read).

At ⑥, host device 304 can generate a compare authentication code (R'). In the embodiment shown, compare authentication code (R') 310 can be generated by encrypting the following with the secret key 338: the code integrity value FW Hash_r read from NVM device 302, the nonce_host value, and the nonce_nvm value received from the NVM device. The resulting encrypted value can be subject to the same HMAC function as the NVM device to generate R.

At ⑦, the host device 304 can compare the authentication code (R) 310 received from NVM device 302 to its generated compare authentication code (R') 310'. If the two authentication codes match (R'=R), the NVM device 302 can be authenticated, and the host device 302 can access and use FW stored in user space 306.

While FIG. 3 shows the use of one particular authentication code (HMAC), embodiments herein can include any suitable authentication code and authentication code process, including but not limited to cipher based authentication codes, such as AES-CMAC or other cryptographic functions. Other embodiments can include unique device identifiers, including a compound device identifier such as that generated by a Device Identifier Composition Engine (DICE).

Figure 4:
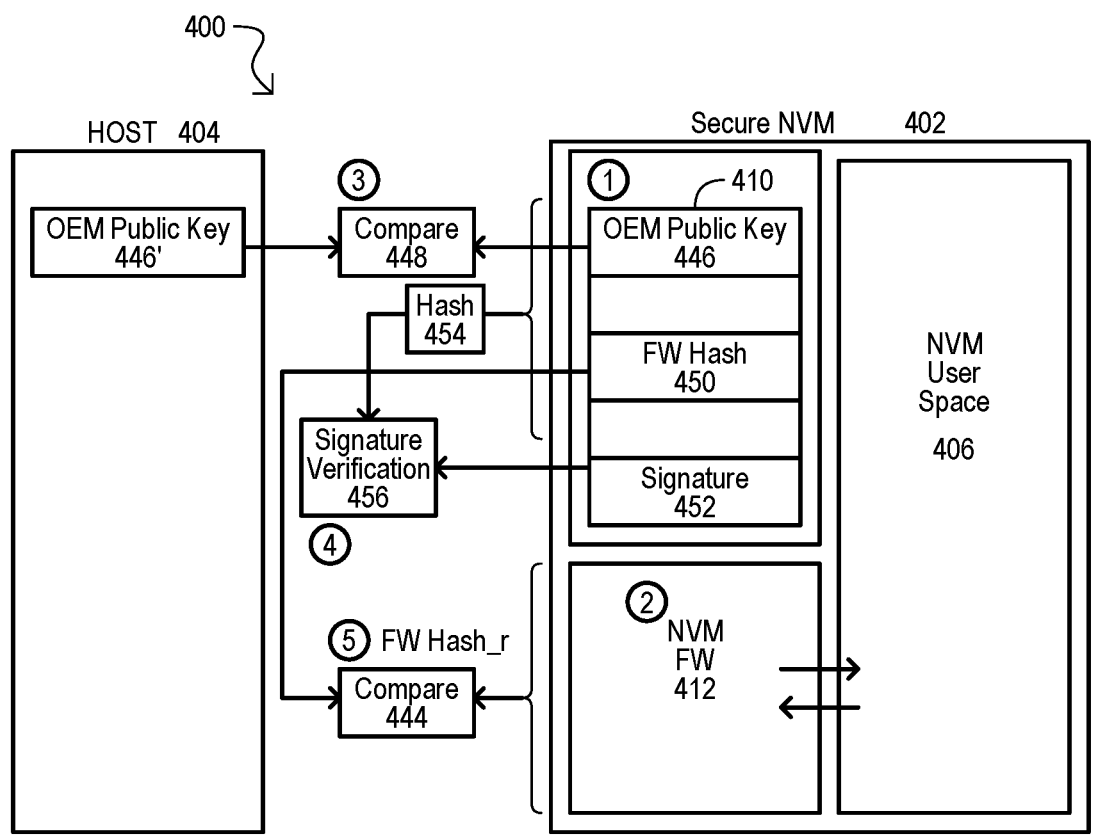
FIG. 4 is a block diagram of a system and corresponding method of authenticating an NVM device state with asymmetric encryption according to an embodiment.

While an authentication operation between a NVM device and host device can include symmetric cryptography, other embodiments can utilize asymmetric cryptography. FIG. 4 shows one such embodiment.

FIG. 4 shows a system 400 that includes a NVM device 402 and a host device 404. In system 400, it is assumed that NVM device 402 can check its own NVM FW integrity upon boot, and that a digital certificate 410 is stored by the NVM device 402. The digital certificate 410 can be generated and signed, using a private key, by an entity associated with the host device 404 (e.g., an original equipment manufacturer, OEM). The digital certificate 410 can include a public key corresponding to the private key. A digital signature can include an encrypted code integrity value (e.g., FW hash). It is also assumed that the host device 404 stores its own version of the public key.

According to embodiments, upon boot, a host device 404 can validate a public key and a digital signature provided by the NVM device. The host device 404 can then compare a code integrity value to a code check value, generated by the NVM device 402 measuring its stored NVM FW.

Referring still to FIG. 4, NVM device 402 can be in communication with host device 404 over one or more connections. NVM device 402 can include a user space 406, store a digital certificate 410, and can store NVM code which can be checked to generate a code integrity value 412. A digital certificate 410 can include a public key 446 and a code integrity value. In some embodiments, a digital certificate 410 can be compatible with the X.509 standard. A digital certificate 410 can include a digital signature 452 generated with a private key. As will be described below, a digital certificate 410 can be loaded into an NVM device 402 by a host device 404.

A host device 404 can store the same public key 446' as NVM device 402. In some embodiments, public key 446' can be stored with nonvolatile circuits located on the host device 404, such as one-time programmable (OTP) memory cells or "eFuse" type circuits. A host device 404 can also execute other functions as will be described below.

An authentication operation for the system 400 will now be described.

At ①, host device 404 can install digital certificate 410 in NVM device 404. In the embodiment shown, digital certificate 410 can have a public key, a valid code integrity value (FW Hash) 450, and a digital signature signed with the private key corresponding to the public key.

At ②, NVM device 402 can generate a code check value (FW Hash_r) for NVM FW stored. The FW Hash_r value can be hash value of the stored NVM FW generated with the same hash function used to generate a code integrity value (FW Hash) included in digital certificate 410.

At ③, host device 404 can receive the public key 446 stored by NVM device 402 and execute a compare operation 448 with its own stored public key 446'. If the public keys match, an authentication operation can continue. If the public keys do not match, NVM device 402 can fail authentication. In some embodiments, such a compare operation 448 can include reading from an addressable location of NVM device 402 (e.g., memory address and/or register address).

At ④, a host device 404 can perform a signature verification operation 456 to verify a digital signature 452 provided from NVM device 402. NVM device 402 can provide a digital signature 452 corresponding to the digital certificate 410 to a host device 404. A digital signature 452 can be value previously encrypted with a private key corresponding to public keys 446/446'. In some embodiments, a NVM device 402 can use a hash function 454 to generate a hash value from all, or portions of the digital certificate (e.g., public key 446, FW Hash 450). A resulting hash value can be provided to host device 404, for use in the authentication process. In such a case, a digital signature 452 can correspond to the hash value (e.g., include the hash value encrypted with the private key). However, in other embodiments, a signature verification 456 operation can include the NVM device 402 sending the digital certificate 410 with a corresponding digital signature 452. Using public key 446', host device 404 can decrypt the digital signature 452. If the decrypted signature matches its corresponding message (e.g., hash value, digital certificate), the code integrity value (FW Hash) included in the digital certificate can be validated. In some embodiments, signature verification values can be sent from NVM device 402 to host device 404 in response to a host device command (e.g., read command from memory or register address).

At ⑤, a host device 404 can compare a code integrity value (FW Hash) to the code check value generated by the NVM device 402 (FW Hash_r). If the two values match (FW Hash=FW Hash_r), the NVM device 402 can be authenticated, and the host device 404 can access and use host FW stored in user space 406. In some embodiments, a code integrity value (FW Hash) can have been received with a digital certificate 410. However, in embodiments in which a hash value is used for signature verification, host device 404 can read the valid code integrity value (FW Hash) from NVM device 402.

Figure 5:
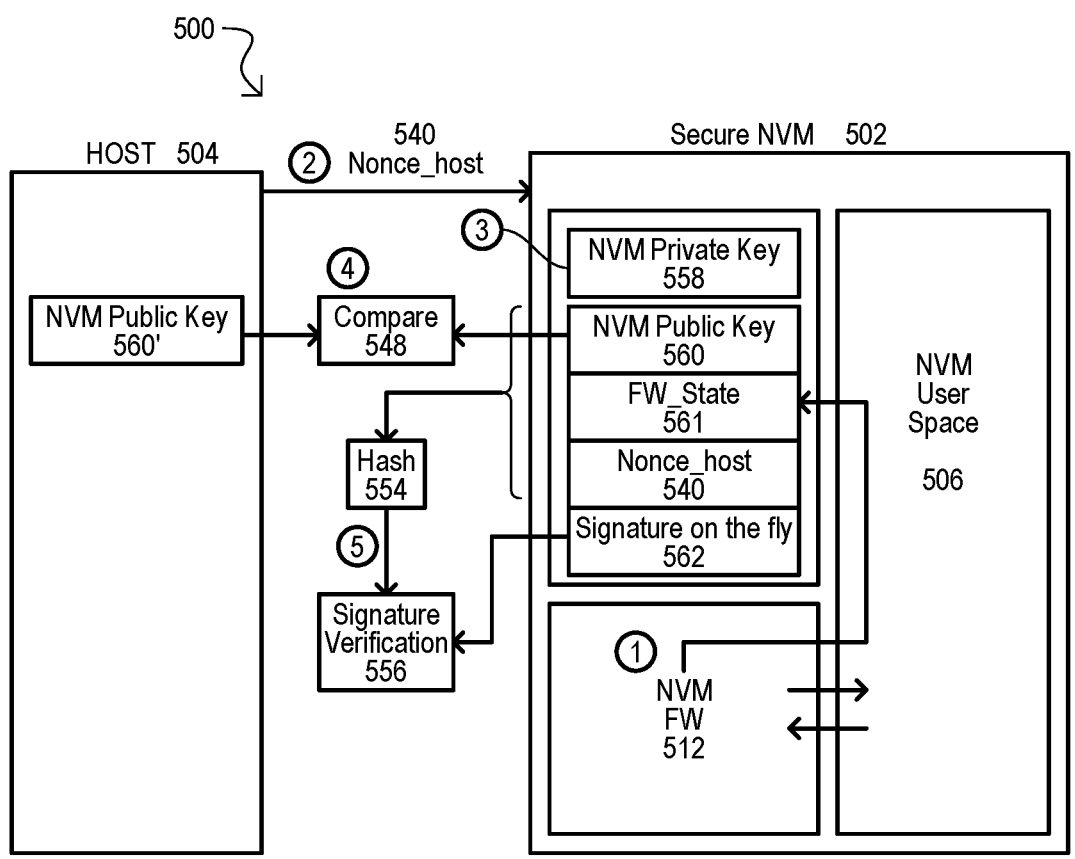
FIG. 5 is a block diagram of a system and corresponding method of authenticating an NVM device state with asymmetric encryption according to another embodiment.

While embodiments can include authentication with asymmetric encryption utilizing a private key originating from a host device (e.g., OEM private key), other embodiments can utilize a private key originating from a NVM device. FIG. 5 is a block diagram of such an embodiment.

FIG. 5 shows a system 500 that includes an NVM device 502 and a host device 504. In system 500, it is assumed that NVM device 502 can check its own NVM FW integrity upon boot and can securely store a private encryption key (NVM Private Key) that is not accessible by a host device

504. It is also assumed that the host device 504 stores a public key corresponding to the NVM private key.

According to embodiments, upon boot, a host device 504 can send a nonce value to NVM device 502. NVM device 502 can return a certificate with a digital signature generated on the fly. The host device 504 can validate the signature to authenticate the NVM device 502.

Referring still to FIG. 5, NVM device 502 be in communication with host device 504 over one or more connections. NVM device 502 can include a private key (NVM Private Key) 558 and a corresponding public key (NVM Public Key) 560. NVM device 502 can also generate a code check value and a digital signature on the fly, using NVM Private Key.

A host device 504 can store the same public key 560' as NVM device 502. In some embodiments, public key 560' can be stored with nonvolatile circuits located on the host device. A host device 504 can also execute other functions as will be described below.

An authentication operation for the system 500 will now be described.

At ①, NVM device 502 can check the integrity of its own NVM FW 512. In some embodiments, such an action can include generating a hash value from the NVM FW, and comparing it with a valid hash value, which can be stored in a secure location on the NVM device 502, for example. In some embodiments, NVM device 502 can generate a FW state value (FW_state), which can indicate the integrity (or lack thereof) of the NVM FW. In some embodiments, if NVM FW fails an integrity check 512, the NVM device can lock out any access to FW it stores, including host FW.

At ②, host device 504 can send a nonce value (nonce_host) to NVM device 502. In some embodiments, such an action can include, but is not limited to, a host device sending a command with the nonce_host value and/or writing the nonce_host value to a predetermined location within NVM device 502 (e.g., register or memory address).

At ③, NVM device 502 can generate a digital signature 562 using NVM private key 558. The digital signature 562 can be generated "on-the-fly" (e.g., in response to host device 504 initiating the authentication operation). The digital signature 562 can be generated from a digital certificate that includes NVM public key 560 (stored by NVM device 502), the received nonce_host value 540, and optionally, the FW Status value. A digital signature 562 can be generated from the actual values of a digital certificate, or generated from a hash value generated from the digital certificate, or a combination of both. In some embodiments, NVM device 502 can send all, or a portion of the digital certificate to host device 504.

At ④, a host device 504 can compare the public key that it stores (560') to the public key (560) received from the NVM device 502. In some embodiments, host device 504 can receive the public key (560) from NVM device 502 as part of a signed digital certificate. If the public keys do not match, NVM device 502 can fail authentication.

At ⑤, host device 504 can perform a signature verification operation 556 to verify a digital signature 562 provided from NVM device 502. NVM device 502 can provide a digital signature 562 corresponding to the digital certificate to a host device 504. As noted above, in some embodiments, NVM device 502 can use a hash function 554 to generate a hash value from all, or portions of the digital certificate. In embodiments, the FW_state value 561 can be included as message data with the hash value. A resulting hash value (with any corresponding message data) can be provided to host device 504, for use in the authentication process. In other embodiments, a signature verification operation 556 can include the NVM device 502 sending the digital certificate (e.g., NVM Public Key 560, nonce_host 540, and optionally FW_state) with a corresponding digital signature 562.

Using public key 560', host device 504 can decrypt the digital signature 562. If the authentication process uses a hash function 554, the host device 504 can use the same hash function to generate a matching hash value (e.g., from public key 560' and nonce_host 540). If the decrypted value matches an expected value, the NVM device 502 can be authenticated. In embodiments that include FW_state value 561, if FW_state value 561 indicates stored FW failed an integrity check (i.e., 512), NVM device 502 can fail authentication (and thus any contents in NVM user space 506, such as host code executable by host device 504, can also fail authentication).

Figure 6:
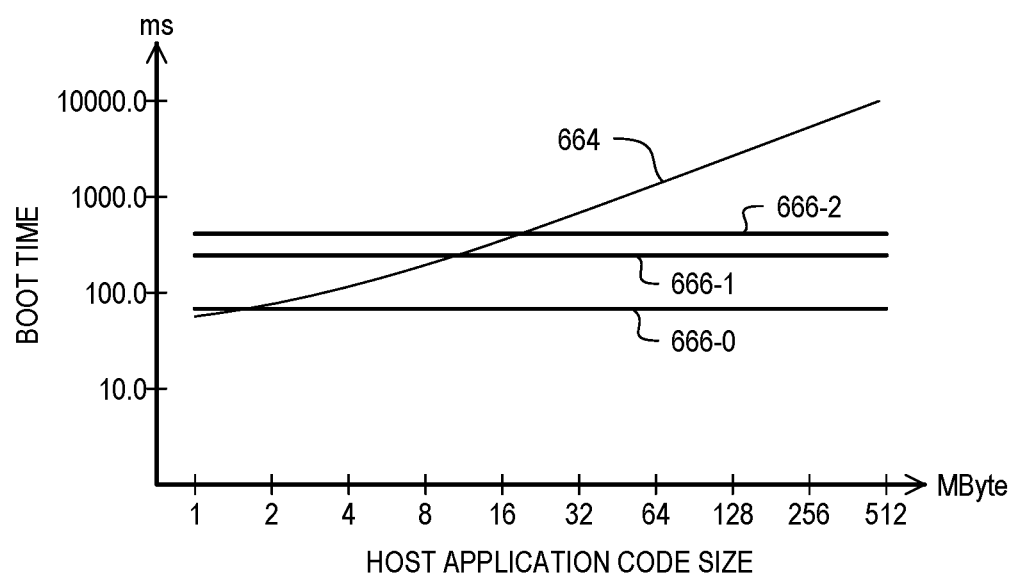
FIG. 6 is a diagram showing a conventional boot time as compared to boot times of various embodiments.

According to embodiments, a system can have fast, secure boot times that can be independent of application (e.g., FW, SW) code size. FIG. 6 is a graph comparing boot times versus code size for various methods disclosed herein. A boot time shown on the Y-axis on a logarithmic scale, and can correspond to the time between a power-on or reset, and the time at which host code (e.g., host FW, application SW) is authenticated and available for use. FIG. 6 shows four responses: response 664 can be a conventional method, like that shown in FIG. 17; response 666-0 can be a method like the embodiment shown in FIG. 3; response 666-1 can be a method like the embodiment shown in FIG. 4; and response 666-2 can be a method like the embodiment shown in FIG. 5. As shown, embodiments (666-0, 666-1, 666-2) can provide constant boot times independent of host code size. In contrast, conventional approaches 664 can have boot times that get longer and longer as host code size increases.

Figure 7:
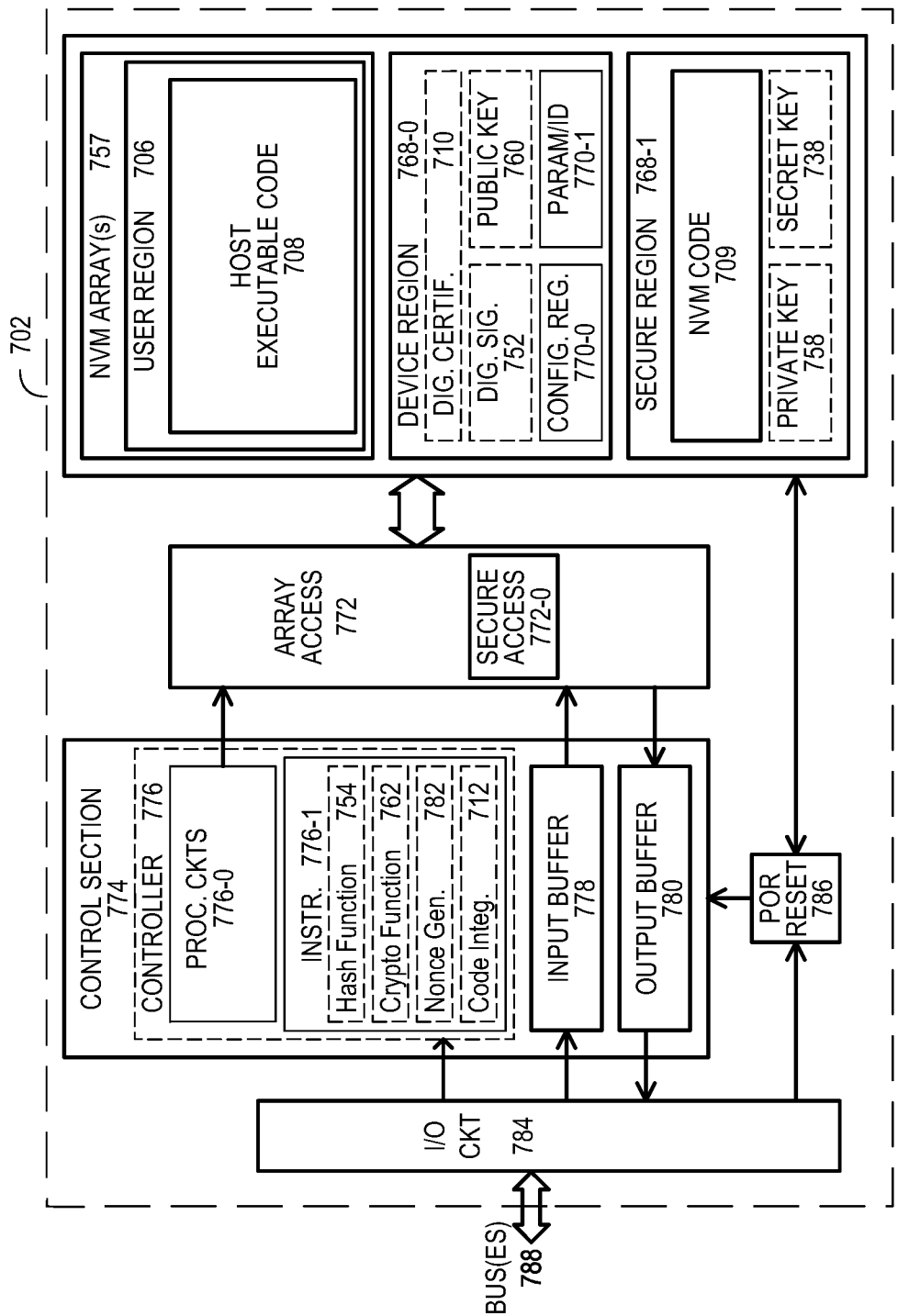
FIG. 7 is a block diagram of a NVM device according to an embodiment.

FIG. 7 is a block diagram of a NVM device 702 according to an embodiment. NVM device 702 can include NVM array(s) 757, a device storage region 768-0, a secure storage region 768-1, array access circuits 772, control section 774, POR circuits 786 and input/output (I/O) circuits 784. NVM array(s) 757 can include one or more arrays formed with any suitable type of NVM cells, and can include decoder circuits and write circuits (e.g., program, erase, verify). NVM array(s) 757 can include a user region 706 which can store host code for execution by a host device 708.

A device storage region 768-0 can store values for use by NVM device 702. Such values can include any of: a digital signature 752 (loaded onto, or generated by the NVM device), a digital certificate 710, and/or a public key 760 (e.g., for asymmetric encryption operations). Device storage region 768-0 can also include configuration registers 770-0 and can store parameter and/or identification information 770-1 for NVM device 702. A device storage region 768-0 may or may not be a secure region. Portions of device storage region 768-0 may or may not be part of NVM array(s) 757.

A secure storage region 768-1 can store data values to be maintained in secrecy. A secure storage region 768-1 can store NVM code 709, one or more private keys 758 (e.g., for asymmetric encryption operations) and/or one or more secret keys 738 (e.g., for symmetric encryption operations). Portions of device secure storage region 768-1 may or may not be part of NVM array(s) 757. NVM code 709 can be code for execution by NVM device 702 to provide various functions.

Array access circuits 772 can enable access to NVM array(s) 757 in response to signals and data received from control section 744. In some embodiments, array access circuits 772 can include command decode logic for processing commands. For NVM devices 702 that include a secure region 768-1, array access circuits 772 can include secure access circuits 772-0 that enable access to a secure region 768-1 from external entities only in response to a predetermined security protocol (e.g., encryption based authentication).

Control section 774 can control functions of NVM device 702, including authentication operations according to embodiments. A control section 774 can include a controller 776, input buffer 778 and output buffer 780. A controller 776 can include processor circuits 776-0 which can execute instructions 776-1. Instructions 776-1 can include various authentication functions, including but not limited to: hash function 754, cryptographic function 762, nonce value generator 782, code integrity checker 712. A hash function 754 can generate hash values for data stored or received by NVM device 702. In some embodiments, a hash function 754 can match, or be configured to match, a hash function used by a corresponding host device. Cryptographic function 762 can perform various cryptographic operations including but not limited to encrypting and/or decrypting values stored by NVM device 702, as well as creating authentication codes using key values. Nonce generator 782 can generate a nonce value (e.g., nonce_nvm) for use in authentication operations. Code integrity checker 712 can check integrity of code stored in NVM user array(s), including NVM code 709. In some embodiments, a code integrity checker 712 can be a hash function (e.g., 754).

Input buffer 778 can receive input commands and/or data received by NVM device 702. Such commands can be processed by array access circuits 772 to access NVM array(s) 757, device storage region 768-0, and device secure storage region 768-1. Output buffer 780 can transfer data output from NVM device 702, including data from NVM array(s) 757, device storage region 768-0, and secure storage region 768-1. Secure storage region 768-1 may not be exposed via I/O circuits 784.

A POR circuit 786 can detect power-on and reset conditions and apply power to the various portions of NVM device 702. In some embodiments, POR circuit 786 can include circuits to load basic function instructions (e.g., ROM data) for execution by processor circuits 776-0.

I/O circuits 784 can be connected to other devices (e.g., a host device) by one or more buses 788. In some embodiments, a bus 788 can be a serial bus, including but not limited, a serial compatible with any of: a controller area network (CAN), serial peripheral interface (SPI) and I²C. I/O circuits 784 can include inputs and outputs for NVM device 702, and other signaling circuits, including but not limited to physical interfaces (PHY), serialization and de-serialization circuits.

Figure 8:
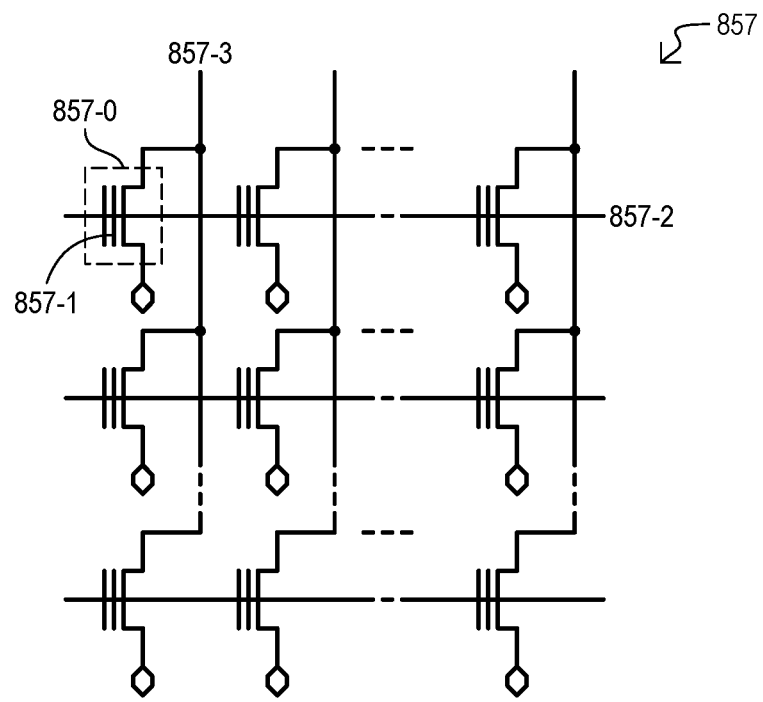
FIG. 8 is a block diagram of a NVM array that can be included in embodiments.

While embodiments can include any suitable NVM array structure and NVM cell type, some embodiments can include 1-transistor (1T) NOR type arrays. FIG. 8 is a schematic diagram of a 1T NOR array 857 that can be included in embodiments. Array 857 can include a number of memory cells (one shown as 857-0) arranged into rows and columns, with memory cells of a same row being connected to a same word line (one shown as 857-2) and memory cells of a same column being connected to a same bit line 857-3. In some embodiments, memory cells (857-0) can be formed with a single transistor structure, having a charge storing structure 857-1 between a control gate a channel. A charge storing structure 857-1 can store one or more bits of data as charge.

Figure 9:
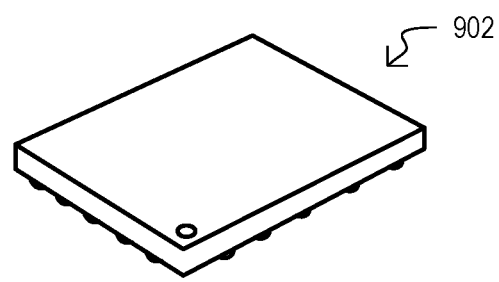
FIG. 9 is a block diagram of an integrated circuit NVM device according to an embodiment.

While embodiments can include systems with memory devices operating in conjunction with a host device, embodiments can also include standalone memory devices capable of authenticating a state of the memory device, and hence the state of code stored by the device. Such authentication can be in a short amount of time, and not vary according a size of the code, as described herein and equivalents. While such memory devices can include multiple integrated circuits formed in a same package, in some embodiments, memory devices can be advantageously compact single integrated circuits (i.e., chips). FIG. 9 shows a packaged single chip NVM device 902. However, it is understood that memory devices according to embodiments can include any other suitable packaging type, including direct bonding of a memory device chip onto a circuit board substrate.

Figure 10:
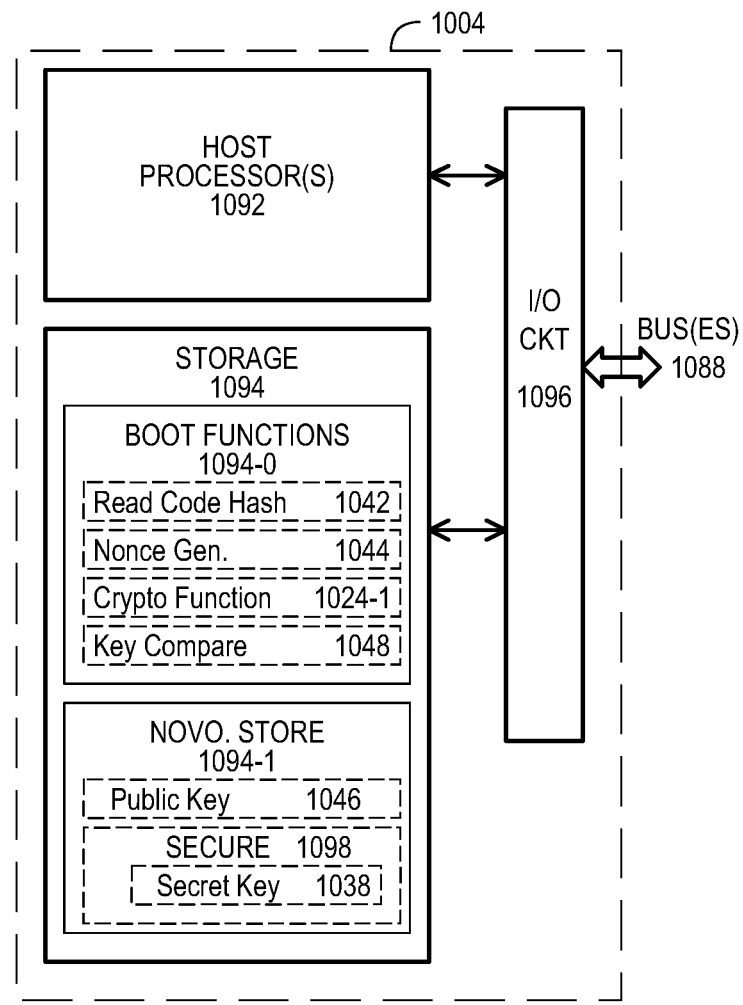
FIG. 10 is a block diagram of a host device according to an embodiment.

FIG. 10 is a block diagram of a host device 1004, according to an embodiment. Host device 1004 can include one or more host processors 1092, a host storage 1094, and I/O circuits 1096. Host storage 1094 can include boot functions 1094-0 and nonvolatile storage 1094-1. Nonvolatile storage 1094-1 can store values for use by a host device 1004 in a nonvolatile fashion (e.g., OTP circuits, eFuses). Stored values can include public keys 1046 and secret keys 1038. In some embodiments, all or a portion of nonvolatile storage 1094-1 can be secure storage 1098.

Boot functions 1094-0 can include but are not limited to: read code integrity function 1042, nonce value generator 1044, cryptographic function 1024-1, key compare function 1048, and hash function 1049. A read code integrity function 1042 can read a check value (e.g., FW Hash_r) from NVM device used in an authentication operation. In some embodiments, such an action can include a read to a predetermined register or memory address. A nonce generator 1044 can generate a nonce value (e.g., nonce_host) for use in authentication operations. Such a nonce value can be transmitted to an NVM device. Cryptographic function 1024-1 can perform cryptographic functions including but not limited to encrypting and/or decrypting values stored on or received by host device 1004 and creating authentication codes using encryption key values (e.g., 1046, 1038). A key compare function 1048 can compare a key (e.g., 1046) stored by host device 1004 to one received from another device (e.g., NVM device). A hash function 1049 can generate hash values for data stored or received by host device 1004. In some embodiments, a hash function 1049 can match, or be configured to match, a hash function used by a corresponding NVM device.

Nonvolatile storage 1094-1 can store values for use by host device 1004 in authentication operations. Such values can include but are not limited to a public key 1046 and/or secret key 1038. A secret key 1038 can be stored in a secure storage 1098, which can require predetermined procedures to access, as described herein.

I/O circuits 1096 can be connected to other devices (e.g., a host device) by one or more buses 1088. I/O circuits 1096 can take the form of any of those described herein.

Figure 11:
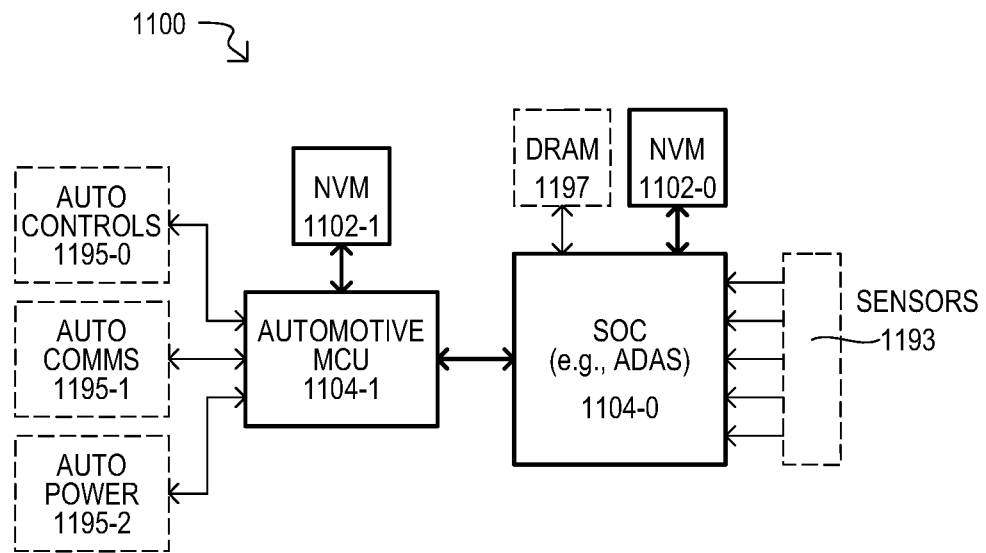
FIG. 11 is a block diagram of an automotive system according to an embodiment.

Embodiments can include any suitable system having a device that needs to rapidly authenticate data stored in another device. However, embodiments can be advantageous in systems that store boot data in high reliability memory devices, such as automobile systems. FIG. 11 shows an automobile system 1100 according to an embodiment. System 1100 can include a first NVM device 1102-0, second NVM device 1102-1, a system-on-chip (SoC) 1104-0, automotive microcontroller (MCU) 1104-1, dynamic random access memory (DRAM) device 1197, sensors 1193, auto controls 1195-0, auto communications systems 1195-1, and auto power systems 1195-2.

SoC 1104-0 and first NVM device 1102-0 can be a host device and corresponding NVM device according to any of the embodiments shown herein. Upon a power-on or reset condition, SoC 1104-0 can authenticate code stored in first NVM device 1102-0 according to any of the embodiments shown herein, or an equivalent. Similarly, MCU 1104-1 and second NVM 1102-1 can be a host device and corresponding NVM device according to any of the embodiments shown herein, or equivalents.

Figure 12:
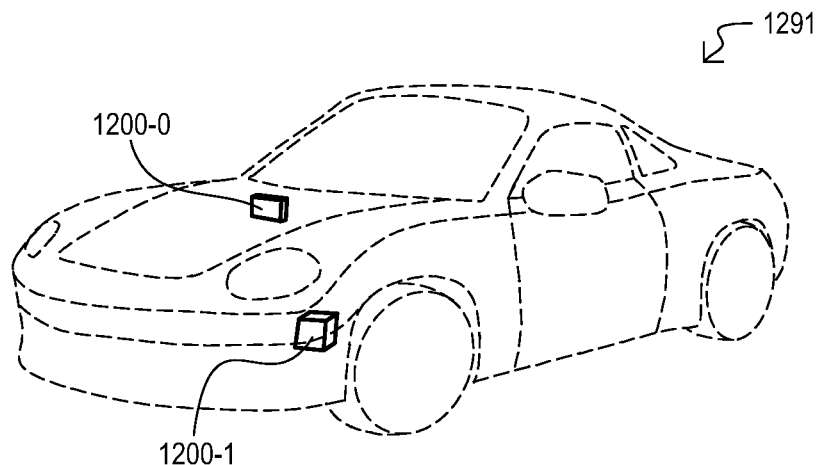
FIG. 12 is a block diagram of an automotive system according to another embodiment.

Referring to FIG. 12 an automobile 1291 according to an embodiment is shown in a diagram. An automobile 1291 that can have numerous sub-systems (two shown as 1200-0 and 1200-1) that operate with firmware booted from NVM device. Such sub-systems (1200-0, 1200-1) can include an electronic control unit (ECU) and/or an advanced driver assistance system (ADAS). However, in other embodiments such sub-systems can include a dashboard display/control sub-system and/or an infotainment sub-system, as but two of numerous possible examples. Each subsystem (1200-0, 1200-1) can include a host device and one or more NVM devices and employ firmware authentication operations as described herein, or equivalents.

While embodiments above have shown various systems, devices and corresponding methods, additional methods will be described with reference to flow diagrams.

Figure 13:
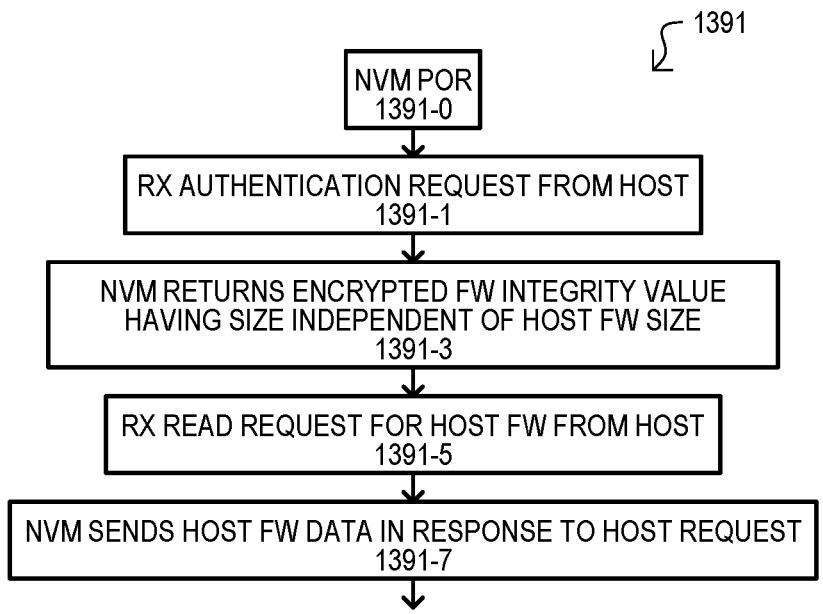
FIG. 13 is a flow diagram of an NVM device authentication method according to an embodiment.

FIG. 13 is a flow diagram of an authentication method 1391 for an NVM device according to an embodiment. A method 1391 can include a NVM device experiencing a boot up triggering event, such a power-on or reset event 1391-0. An NVM device can receive an authentication request from a host device 1391-1. Such an action can include a NVM device receiving a predetermined command from a host device over a communication link, such as a serial bus as but one of many possible examples.

In response to an authentication request, a NVM device can return an encrypted FW integrity value having a size independent of host code it validates 1391-3. A FW integrity value can be used to validate code (e.g., SW or FW) stored on the NVM device. In some embodiments, a FW integrity value can be generated from a known good set of NVM code (e.g., a hash of known good NVM code). Such an action can include a NVM device returning the FW integrity value over a communication link. A host device can validate code stored by the NVM device using the FW integrity code. Because a FW integrity value can have a size independent of the size of the stored code, the time required for authentication can be fast and deterministic.

If a host device authenticates the NVM code with the encrypted valid FW integrity value, NVM device can receive read request to access host FW stored by the NVM device 1391-5. In response to such read requests, NVM device can send FW data. In some embodiments, this can include sending code for execution by a host device.

Figure 14:
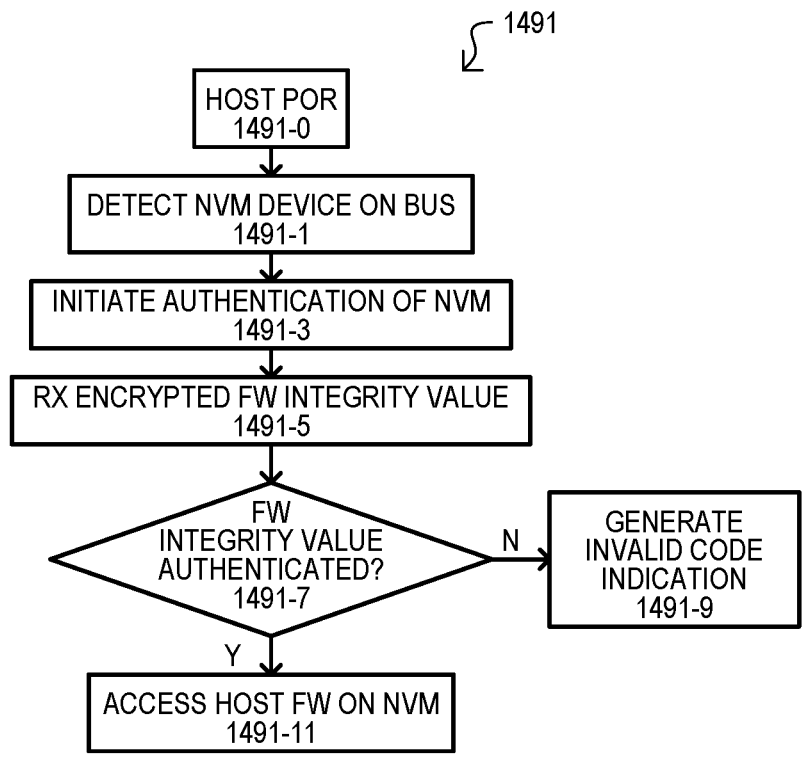
FIG. 14 is a flow diagram of a host device authentication method according to an embodiment.

FIG. 14 is a flow diagram of an authentication method 1491 for a host device according to an embodiment. A method 1491 can include a host device experiencing a boot up triggering event (e.g., POR) 1491-0.

A host device can detect an NVM device on a bust 1491-1. Such an action can include executing a discovery protocol according to a communication standard. If an NVM device is detected, a method 1491 can initiate the authentication of the detected NVM device 1491-3. Such an action can include a host device issuing authentication challenges (e.g., predetermined commands) to the NVM device on a bus or other suitable communication link.

In response to an authentication request, host device can receive an encrypted FW integrity value having a size independent of the host code it validates 1491-5. A FW integrity value can be used to validate host code (e.g., SW or FW) stored on the NVM device. In some embodiments, a valid FW integrity value can be generated from a known good set of NVM code (e.g., a hash of known good NVM code stored securely by the NVM device). Such an action can include a NVM device returning the valid FW integrity value over a communication link. A host device can validate code stored by the NVM device using the FW integrity code 1491-7. Because a valid FW integrity value can have a size independent of the size of the stored host code, the time required for authentication can be fast and deterministic.

If a host device authenticates the NVM code with the encrypted FW integrity value (Y from 1491-7), a host device can access host FW stored by the NVM device 1491-11. Such an action can include issuing read instructions for XiP code operations. If a host device does not authenticate the NVM code (N from 1491-7), a host device can generate an invalid code indication 1491-9. In response to such an indication, a host device can be prevented from accessing the host FW. In some embodiments, a host device can generate a boot error code indicating the host FW has been deemed invalid.

Figure 15:
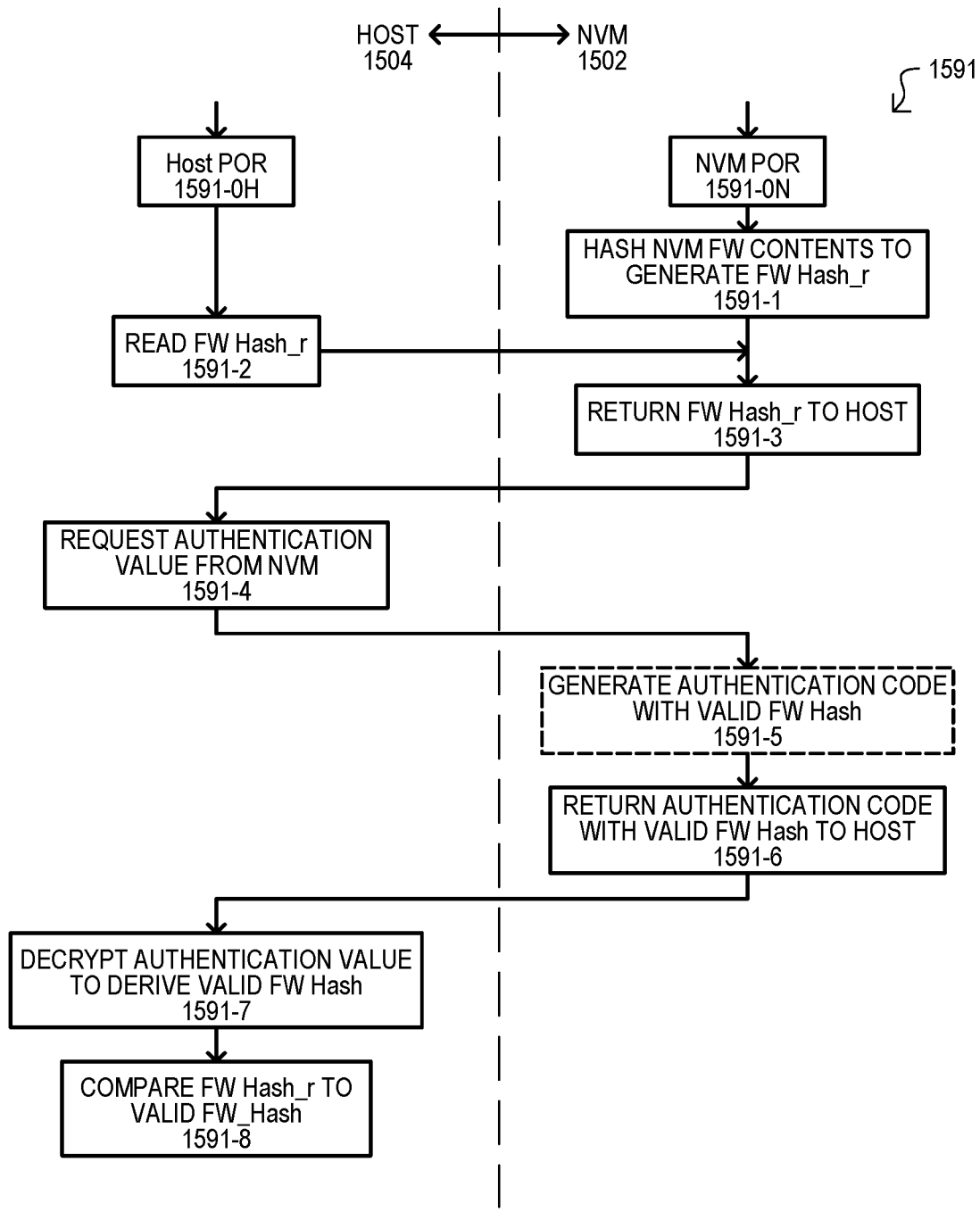
FIG. 15 is a flow diagram of an authentication method according to an embodiment.

FIG. 15 is a flow diagram of an authentication method 1591 between a host device 1502 and a NVM device 1504. A NVM device 1502 or a host device 1504 can undergo a boot up event (e.g., POR) (1591-0H/0N). In response to boot up of the NVM device, NVM device can generate a hash value for NVM FW that is stores (FW Hash_r) 1591-1. NVM FW can be FW executable by the NVM device to enable NVM device functions. NVM FW can be stored in a secure location and may not be accessible by entities external to the NVM device, or only accessible via secure access functions. A host device can send a read command to the NVM device to access the FW Hash_r 1591-2. In response to such a read request, NVM device can return the FW Hash_r value to the host device 1591-3.

A method 1591 an include a host device requesting an authentication value from the NVM device 1591-4. In some embodiments, in response to such a request, a NVM device can generate an authentication value using a valid hash value FW Hash 1591-5. A valid has value (FW Hash) can be a value generated with a known good version of the NVM FW. In some embodiments, a NVM device can generate the authentication value by encrypting data on the fly. Such encryption can be symmetrical (i.e., with a secret key also stored by the host device) or asymmetrical (i.e., with a private key having a corresponding public key stored by the host device). However, in other embodiments, a NVM device can be pre-loaded with an authentication value (e.g., digital certificate with a digital signature). Whether an authentication value is generated by the NVM device or pre-loaded into the NVM device, the NVM device can return the authentication code to the host device 1591-6.

A host device can decrypt all or a portion of an authentication code received from a NVM device to derive the valid FW Hash value 1591-7. The valid FW Hash value can be compared to that read from the NVM device (FW Hash_r) 1591-8 to validate the NVM device (and hence any host FW it stores). That is, if the values match, the host FW stored by the NVM device can be authenticated for use by the host device. If the values do not match, the host FW stored by the NVM device can be determined to be not authenticated.

Figure 16:
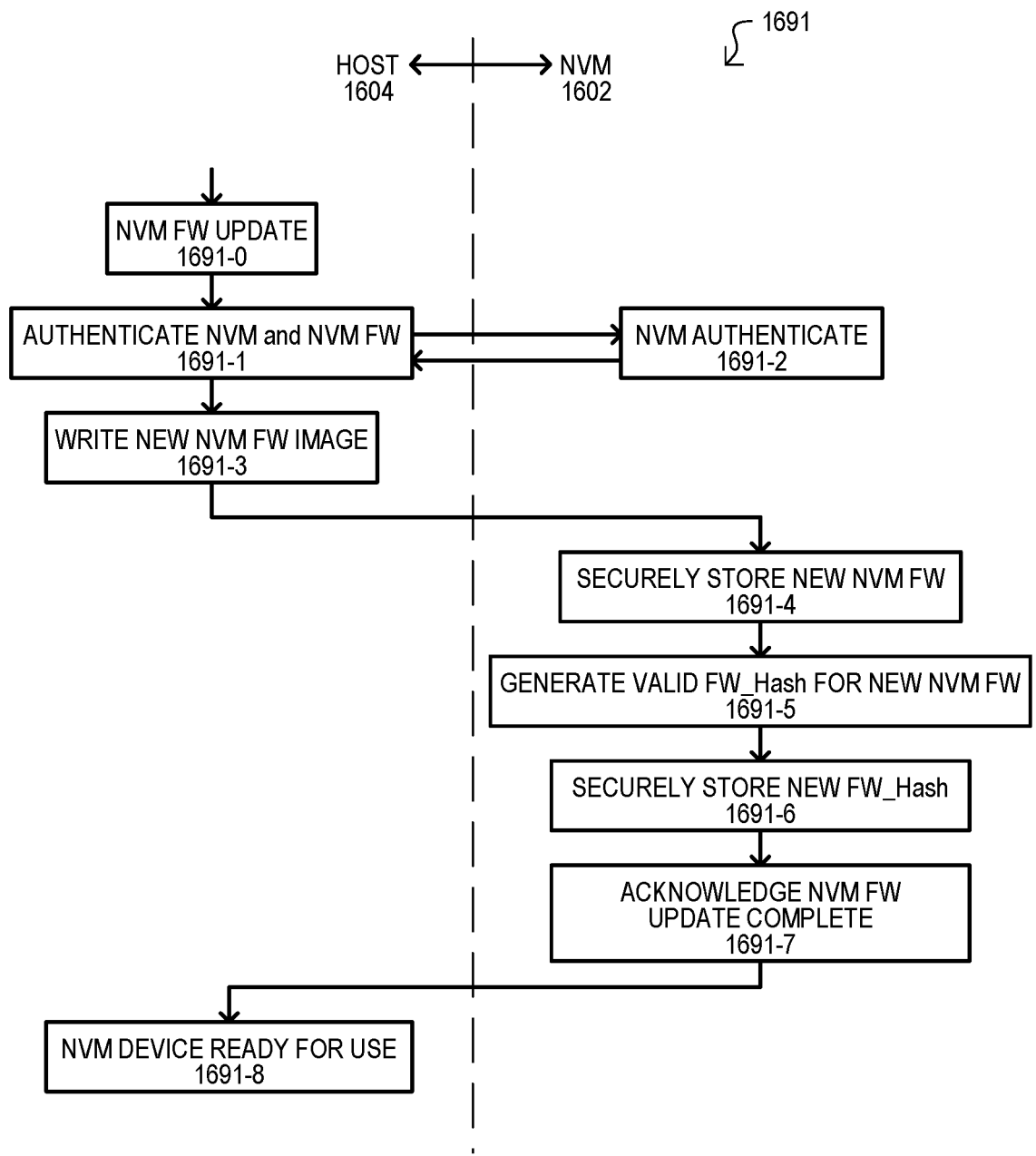
FIG. 16 is a flow diagram of a code (e.g., firmware) update operation according to an embodiment.

FIG. 16 is a flow diagram of a method 1691 for a host device 1604 to update NVM FW in a NVM device 1602 according to an embodiment. A method 1691 can include a host device receiving new NVM FW for an update operation 1691-0. Such an action can include any suitable method, including an authentication operation between the host device and the source of the new NVM FW. A host device 1602 can authenticate the NVM device and old FW (FW currently stored by NVM device) (1691-1/2). Such an operation can include any suitable method, including those described herein, or equivalents. A host device 1604 can write the new NVM FW into the NVM device 1691-3. In some embodiments, such an action can include writing a NVM FW image executable by the NVM device.

NVM device 1691-4 can securely store the new NVM FW 1691-4. Such an action can include writing the NVM FW to a predetermined location determined by a NVM device configuration or by the host device. NVM device can generate a new hash value (FW Hash) for the new NVM FW 1691-5. Such a value can be securely stored within the NVM 1691-6 for use in future authentication operations, such as those described herein, or equivalents. Once the new NVM FW is stored, and valid FW Hash value is generated, NVM device can send an acknowledgement to the host device that the NVM FW update operation is complete 1691-7.

According to embodiments, a host device can authenticate a NVM device state to thereby authenticate the code stored by the NVM device. Such an approach can eliminate the need for a host device to access host code stored by the NVM device in an authentication operation, as is done in conventional methods. As a result, systems can have secure boot times that are fast and independent of the size of the code stored by the NVM device.

Embodiments can differ from conventional approaches in that an authentication mechanism of a host device can authenticate the state of a NVM device, and not the state of host code stored by the NVM device. Further, a NVM device can include a mechanism to prove the integrity of the NVM code it currently stores. In some embodiments, this can include a NVM device having secure storage locations, for storing code integrity values used to prove the integrity of NVM code stored by the NVM device.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claims require more features than are expressly recited in each claim. Rather, inventive aspects lie in less than all features of a single foregoing disclosed embodiment. Thus, the claims following the detailed description are hereby expressly incorporated into this detailed description, with each claim standing on its own as a separate embodiment of this invention.

What is claimed is:

1. A method, comprising:
   storing host code executable by a host device in a nonvolatile memory (NVM) device and NVM code executable by the NVM device;
   by operation of the NVM device:
   validating integrity of the NVM code in response to predetermined conditions;
   generating a code integrity value for validating the NVM code, the code integrity value having a size independent of a size of the host code;
   sending an authentication code to the host device, the authentication code generated with at least the code integrity value; and
   in response to read requests from the host device, returning at least portions of the host code for execution by the host device.

2. The method of claim 1, wherein the code integrity value comprises a hash of at least a portion of the NVM code.

3. The method of claim 1, wherein the code integrity value is selected from the group of: a message authentication code (MAC) and unique device identifier.

4. The method of claim 1, further including:
   by operation of the NVM device, generating a hash value of the NVM code; and
   in response to a request from a host device, sending an authentication code generated with the hash value to the host device.

5. The method of claim 1, further including:
   by operation of the NVM device, generating an authentication code with a value specific to the NVM device and at least a portion of the NVM code; and
   by operation of the host device, authenticating the authentication code using a secure value stored by the host device.

6. The method of claim 1, further including:
   receiving a host nonce value at the NVM device; and
   executing a cryptographic function on at least the host nonce value and the code integrity value to generate the authentication code.

7. The method of claim 6, further including:
   encrypting at least the host nonce value, the code integrity value, and a NVM device nonce value to generate the authentication code.

8. The method of claim 1, further including:
   storing a digital certificate in the NVM device, the digital certificate including a public key, the code integrity value, and a digital signature generated with a private key; and
   in response to a certificate request from a host device, sending the digital certificate to the host device.

9. A nonvolatile memory (NVM) device, comprising:
   at least one NVM array comprising a plurality of NVM cells that are configured to store host code for execution by a host device and NVM code for execution by the NVM;
   input/output (I/O) circuits configured to communicate with a host device over at least one communication link;
   a storage region configured to store a code integrity value for validating the NVM code, the code integrity value having a size independent of a size of the host code; and a NVM controller section configured to:
upon startup of the NVM device, validate integrity of the NVM code, and
in response to a request from the host device, output an authentication code via the I/O circuits, the authentication value generated with at least the code integrity value;
wherein the at least one NVM array, I/O circuits, storage region and controller section are formed with a same integrated circuit substrate.

10. The NVM device of claim 9, wherein:
the NVM controller section comprises at least one processor configured to execute NVM device processor instructions.

11. The NVM device of claim 9, wherein:
the NVM controller section includes a hash generator configured to generate a hash value from the NVM code.

12. The NVM device of claim 9, wherein:
the NVM controller section includes cryptographic circuits configured to generate at least the code integrity value with a predetermined encryption key.

13. The NVM device of claim 12, wherein:
the cryptographic circuits include asymmetric cryptography circuits, and the predetermined encryption key includes a private key corresponding to public key.

14. The NVM device of claim 9, wherein:
the NVM controller section includes a nonce value generator.

15. The NVM device of claim 9, wherein:
the NVM controller section includes an authentication circuit configured to generate a message authentication code (MAC) that includes at least the code integrity value, and the NVM controller section is configured to send the MAC to the host device.

16. The NVM device of claim 9, further including:
the at least one NVM array includes a secure storage region configured to enable access to NVM code stored therein only in response to at least one secure access procedure.

17. A system, comprising:
a nonvolatile memory (NVM) device that includes: at least one NVM cell array configured to store code executable by a host device and NVM code executable by the NVM device,
an NVM controller circuit configured to,
upon startup of the NVM device, validate integrity of the NVM code, and
output an authentication code generated by executing a NVM cryptographic function on a code integrity value, the code integrity value having a size independent of a size of the host code; and
the host device includes at least one host processor configured to
execute a host cryptographic function in response to the authentication code to authenticate the NVM device and host code stored by the NVM device, and
execute the host code stored by the NVM device.

18. The system of claim 17, wherein:
the at least one NVM cell array comprises a NOR flash array.

19. The system of claim 17, wherein:
the at least one host processor is further configured to generate a host nonce value for transmission to the NVM device.

20. The system of claim 17, wherein: the at least one host processor is further configured to access a host key and execute a cryptographic function with the host key in response to receiving the authentication code.

21. The system of claim 17, wherein:
the host processor is coupled to the NVM memory device by a bus.

22. The system of claim 17, wherein:
the host device is configured to execute the host code directly from the NVM device.

23. The system of claim 17, wherein the host device and the NVM device are a part of a subsystem in an automobile.

* * * * *